United States Patent
Steward et al.

(10) Patent No.: US 9,631,715 B1
(45) Date of Patent: Apr. 25, 2017

(54) ONE-PIECE INTEGRATED CHAIN SNUBBER AND OIL DIVERTER FOR A TRANSAXLE

(71) Applicant: FORD GLOBAL TECHNOLOGIES, LLC, Dearborn, MI (US)

(72) Inventors: Mark Steward, Ann Arbor, MI (US); Srinivas V. Arcota, Northville, MI (US); Vladimir Yasnogorodskiy, Sterling Heights, MI (US); Bradley R. Heuver, South Lyon, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 50 days.

(21) Appl. No.: 14/887,683

(22) Filed: Oct. 20, 2015

(51) Int. Cl.
| | | |
|---|---|---|
| F16H 57/04 | (2010.01) | |
| F16H 7/18 | (2006.01) | |
| F01M 1/00 | (2006.01) | |
| F01M 9/06 | (2006.01) | |
| F16N 7/16 | (2006.01) | |
| F16H 57/05 | (2006.01) | |

(52) U.S. Cl.
CPC ........... *F16H 57/0423* (2013.01); *F16H 7/18* (2013.01); *F16H 57/0457* (2013.01); *F16H 57/05* (2013.01); *F16H 2007/185* (2013.01)

(58) Field of Classification Search
CPC .... F16H 57/0423; F16H 57/05; F16H 57/045; F16H 7/18; F16H 57/0457
USPC ................. 474/91, 140; 184/6.12, 15.1, 11.1
See application file for complete search history.

(56) References Cited

U.S. PATENT DOCUMENTS

| | | | | |
|---|---|---|---|---|
| 1,161,724 A | * | 11/1915 | Pierce | F16H 57/0421 184/11.1 |
| 1,441,857 A | * | 1/1923 | Johnson | F16N 39/06 184/11.3 |
| 1,771,346 A | * | 7/1930 | Perry | F16H 57/0456 184/15.1 |
| 1,771,835 A | * | 7/1930 | Bartlett | F16H 57/05 184/13.1 |
| 1,960,693 A | * | 5/1934 | Bryant | F16H 57/0421 184/13.1 |
| 1,998,682 A | * | 4/1935 | McCann | B62J 31/00 184/15.1 |

(Continued)

FOREIGN PATENT DOCUMENTS

JP          3163555 B2    5/2001

*Primary Examiner* — Henry Liu
(74) *Attorney, Agent, or Firm* — James Dottavio; MacMillan, Sobanski & Todd, LLC

(57) ABSTRACT

A transaxle for a vehicle has a case adapted to retain a transaxle oil. A chain transfers torque between transaxle gears, and a snubber is disposed along the tension side of the chain. The snubber comprises a molded base plate with a pair of mounting inserts extending transverse to the base plate to mount the snubber to a case of the transaxle. A snubber plate is integrally molded with the base plate and extends substantially transversely from a longitudinal side of the base plate to frame an edge of the chain. A ramp plate is integrally molded with the base plate and extends substantially transversely from the base plate and obliquely with respect to the snubber plate. A scoop is integrally molded with the base plate and extends from the ramp plate configured to transversely deflect a flow of transaxle oil directed to the scoop by the ramp plate.

12 Claims, 5 Drawing Sheets

(56) References Cited

U.S. PATENT DOCUMENTS

| | | | | |
|---|---|---|---|---|
| 2,601,789 | A * | 7/1952 | Riopelle | F16H 7/18 474/140 |
| 2,718,153 | A * | 9/1955 | Dean | F16H 7/06 198/837 |
| 3,012,632 | A * | 12/1961 | Bradley | B62J 31/00 184/15.1 |
| 3,529,698 | A * | 9/1970 | Nelson | B61C 17/08 184/11.2 |
| 3,625,310 | A * | 12/1971 | Herrick | F16H 57/0447 184/13.1 |
| 3,724,582 | A * | 4/1973 | Wood | B62J 13/04 180/219 |
| 4,193,314 | A | 3/1980 | Horner et al. | |
| 4,630,711 | A * | 12/1986 | Levrai | F16H 57/0447 184/11.1 |
| 4,693,133 | A * | 9/1987 | Tomita | F16H 57/0006 184/6.12 |
| 4,721,184 | A * | 1/1988 | Sowards | F16H 57/0447 184/11.1 |
| 5,257,962 | A | 11/1993 | Martin et al. | |
| 5,273,136 | A * | 12/1993 | Martin | F16H 57/0421 184/6.12 |
| 5,720,682 | A * | 2/1998 | Tada | F01M 9/108 184/15.1 |
| 6,000,373 | A * | 12/1999 | Woodhouse | F01M 1/02 123/196 M |
| 6,554,728 | B2 * | 4/2003 | Young, Jr. | B62J 13/00 474/140 |
| 7,686,137 | B2 * | 3/2010 | Tominaga | F16H 57/0406 184/11.3 |
| 7,882,819 | B2 * | 2/2011 | Koyama | F01M 1/08 123/192.1 |
| 7,942,769 | B2 * | 5/2011 | Pflug | F16H 7/18 474/111 |
| 7,984,791 | B2 * | 7/2011 | Taguchi | F16H 57/0483 184/11.1 |
| 8,366,577 | B2 * | 2/2013 | Shibayama | F16H 57/0457 475/159 |
| 8,387,244 | B2 * | 3/2013 | Markley | F01L 1/022 123/90.31 |
| 8,657,073 | B2 * | 2/2014 | Matsumoto | F16H 57/0483 184/11.1 |
| 8,672,094 | B2 * | 3/2014 | Quehenberger | F16H 57/0419 184/6.12 |
| 8,701,837 | B2 * | 4/2014 | Yamamoto | F16H 7/06 184/11.1 |
| 8,739,930 | B2 * | 6/2014 | Bonning | F16H 57/0436 184/6.12 |
| 8,875,841 | B2 * | 11/2014 | Yoshimi | F16H 3/006 184/6.12 |
| 8,919,500 | B1 * | 12/2014 | Kilcrease | F01M 9/06 184/11.5 |
| 9,046,166 | B2 * | 6/2015 | Neumeister | F16H 57/0409 |
| 2004/0142792 | A1 * | 7/2004 | Glas | F16H 59/36 477/70 |
| 2006/0054407 | A1 * | 3/2006 | Wirth | F16H 57/05 184/6.12 |
| 2006/0065487 | A1 * | 3/2006 | Tominaga | F16H 57/0406 184/6.12 |
| 2006/0100047 | A1 * | 5/2006 | Churchill | F16H 7/18 474/109 |
| 2006/0278475 | A1 * | 12/2006 | Takahashi | F16H 57/0423 184/6.12 |
| 2008/0308354 | A1 * | 12/2008 | Gratzer | B60K 17/344 184/6.12 |
| 2009/0325748 | A1 * | 12/2009 | Pflug | F16H 7/18 474/91 |
| 2011/0244999 | A1 * | 10/2011 | Nakamura | F16H 9/18 474/91 |
| 2011/0250999 | A1 * | 10/2011 | Nagele | B62J 31/00 474/91 |
| 2013/0109517 | A1 * | 5/2013 | Tiernan | F16H 57/05 474/91 |
| 2015/0204437 | A1 * | 7/2015 | Utaki | F16H 7/18 474/91 |

\* cited by examiner

ONE-PIECE INTEGRATED CHAIN SNUBBER AND OIL DIVERTER FOR A TRANSAXLE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to chain-driven transaxles for motor vehicles, and, more specifically, to an integrated chain snubber and oil diverter.

A transaxle (i.e., an assembly combining a transmission and a differential) may utilize a drive link to transfer power from the engine crankshaft to the input of the transmission or gearbox. A drive chain and sprockets are commonly used for the link.

Since the drive chain is typically below the sump level, it is immersed in transmission oil. Movement of the chain through a bulk volume of oil can result in oil windage and parasitic losses. Consequently, baffling structures are often put in place around the chain to reduce interaction between the chain and oil.

When there is significant interaction between the drive chain and the transmission fluid or oil, undesirable circulation patterns may result. In order to set up a fluid circulation that distributes oil where needed and effectively collects it for return to the fluid sump, a series of components such as tubes, seals, and connectors as well as routing paths machined into metallic components have often been required. These measures add cost and complexity to the transaxle.

During operation of the transaxle, resonant vibrations may occur in the tension side of the drive chain between the sprockets. To control the vibrations, it is known to introduce a snubber adjacent to the chain. The snubber may typically provide a guide surface formed by a plate extending along a portion of the chain.

The space available for containing a transaxle in a vehicle may be severely limited, making it difficult to fit all the necessary components without comprising functionality. It would be desirable to provide a compact drive chain apparatus having oil baffling and snubbing of vibrations, while simultaneously reducing cost and simplifying manufacturing.

SUMMARY OF THE INVENTION

The invention solves the foregoing problems by integrating a flat-plate snubber for damping chain resonance with an oil diverter having an oil scraper and oil diversion scoop. The diverter is integrated with the snubber in a single-piece molding, and the two elements share their structural integrity and share a common attachment to the transaxle case. By combining the two functions into one integrated component, overall cost is reduced and the manufacture of the component and its assembly into the transaxle are greatly simplified. Furthermore, additional components for creating a desired oil circulation otherwise needed in view of the unwanted influence of the drive chain are avoided by using the scoop of the present invention which allows the fluid to be drained back to the sump with minimal contact with the drive chain. Thus, the invention beneficially improves fuel efficiency of a vehicle by reducing system drag at the same time as reducing part count, packaging space, and the cost of parts and assembly.

In one aspect of the invention, a snubber for a chain in a transaxle comprises a molded base plate with a pair of mounting inserts extending transverse to the base plate to mount the snubber to a case of the transaxle. A snubber plate is integrally molded with the base plate and extends substantially transversely from a longitudinal side of the base plate to frame an edge of the chain. A ramp plate is integrally molded with the base plate and extends substantially transversely from the base plate and obliquely with respect to the snubber plate. A scoop is integrally molded with the base plate and extends from the ramp plate configured to transversely deflect a flow of transaxle oil directed to the scoop by the ramp plate.

DETAILED DESCRIPTION OF PREFERRED EMBODIMENTS

Figure 1:
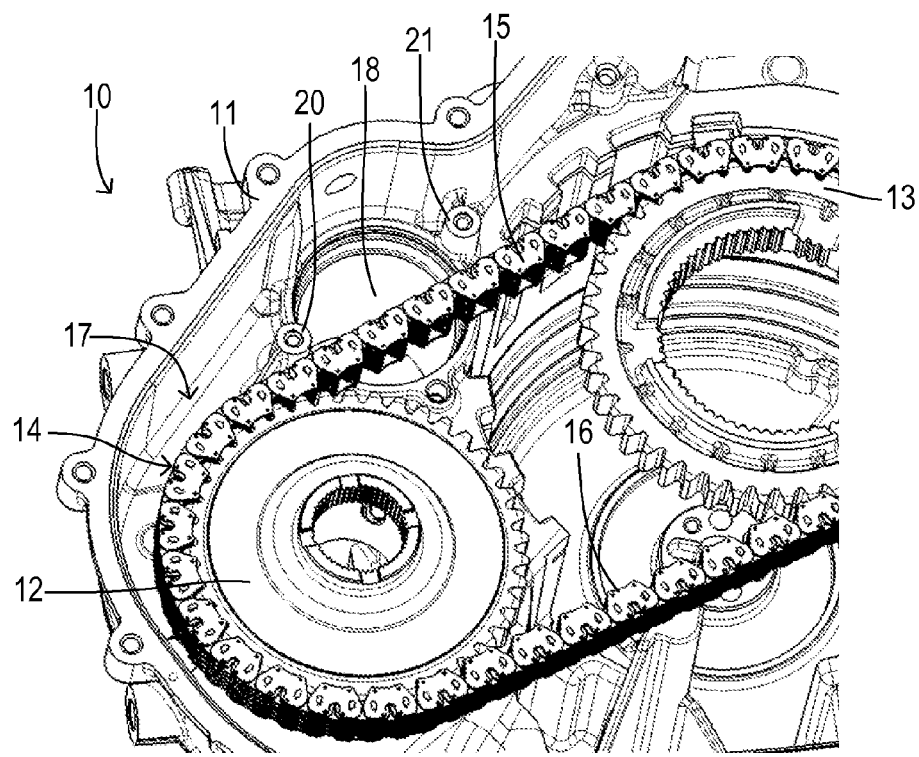
FIG. 1 is a perspective view of a partial transaxle assembly.

Referring to FIG. 1, a transaxle assembly 10 includes a case 11 containing sprockets 12 and 13 together with a drive chain 14. Chain 14 has a tension side 15 and a slack side 16. Case 11 further defines an interior volume 17 which receives transmission oil circulated by a sump (not shown). Case 11 may include an accumulator section 18 for holding a volume of oil to support start-stop engine operation. Alongside the periphery of tension side 15 of chain 14, a pair of bosses 20 and 21 extend from the side of case 11 in order to receive an integrated snubber/diverter 25 attached to bosses 20 and 21 by bolts 26 and 27 as shown in FIG. 2.

Figure 3:
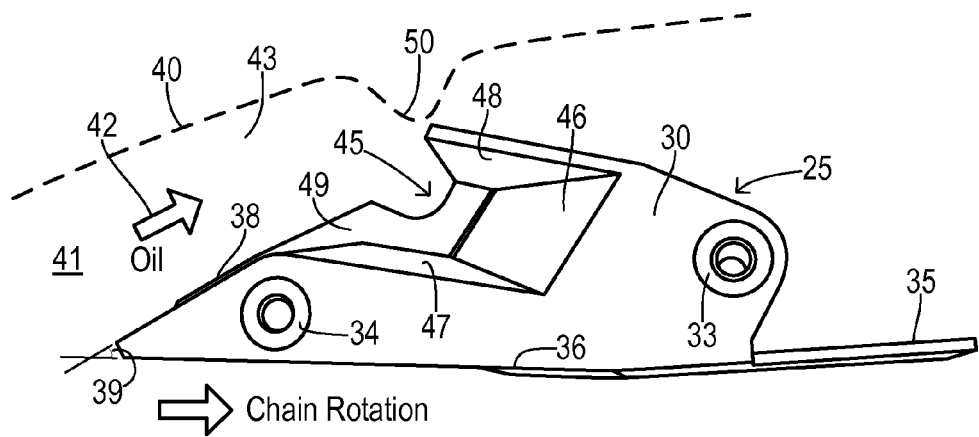
FIG. 3 is a front, plan view of the snubber/diverter of FIG. 2.
Figure 4:
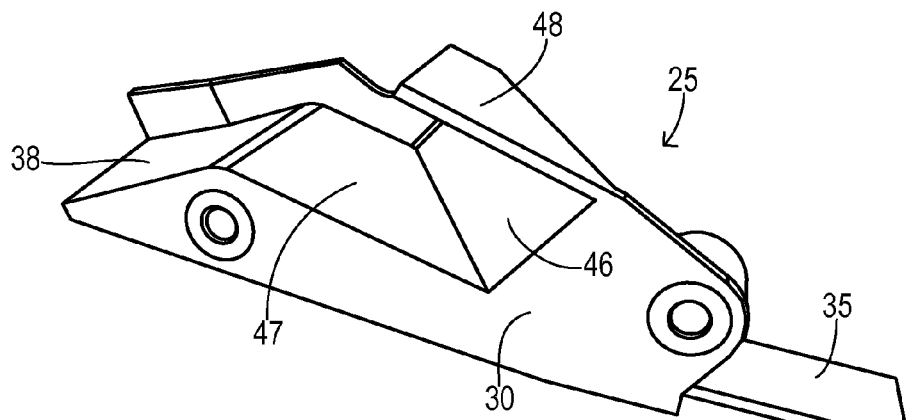
FIG. 4 is a front, perspective view of the snubber/diverter of FIG. 2.
Figure 5:
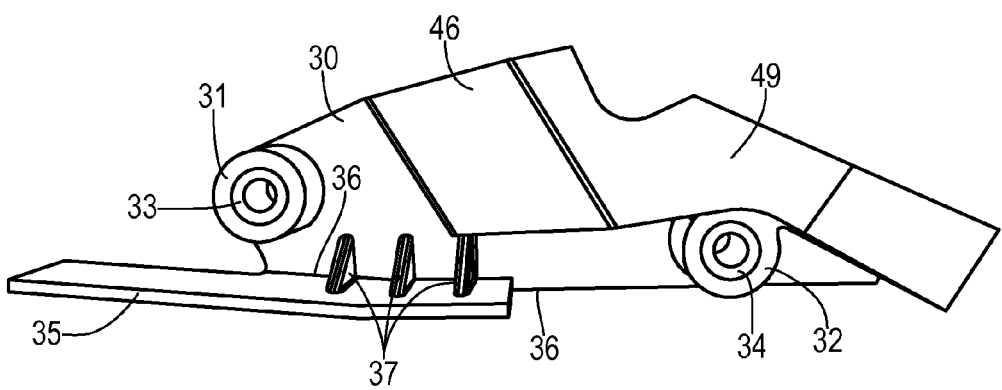
FIG. 5 is a rear, plan view of the snubber/diverter of FIG. 2.
Figure 6:
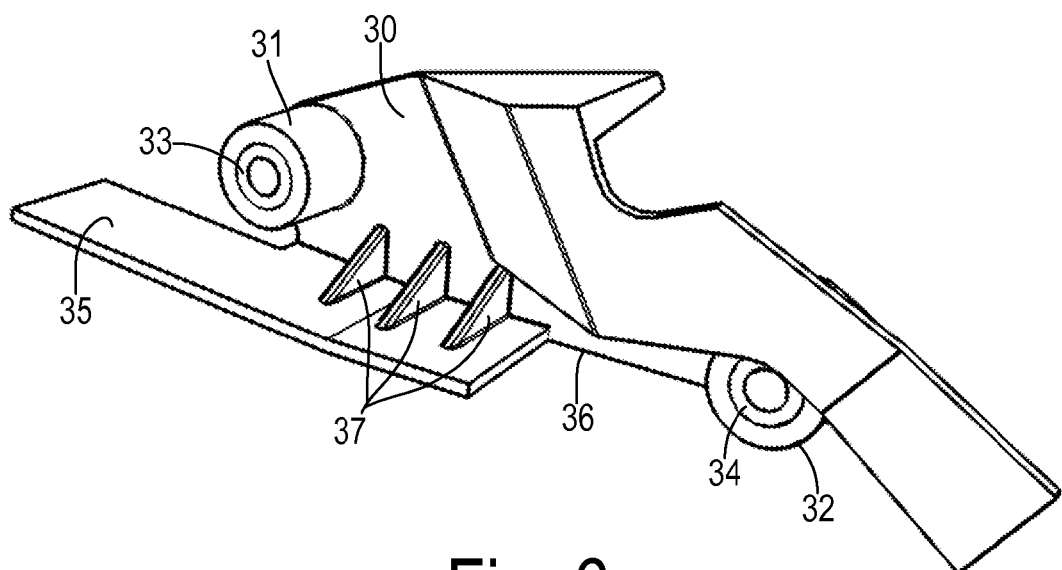
FIG. 6 is a rear, perspective view of the snubber/diverter of FIG. 2.
Figure 7:
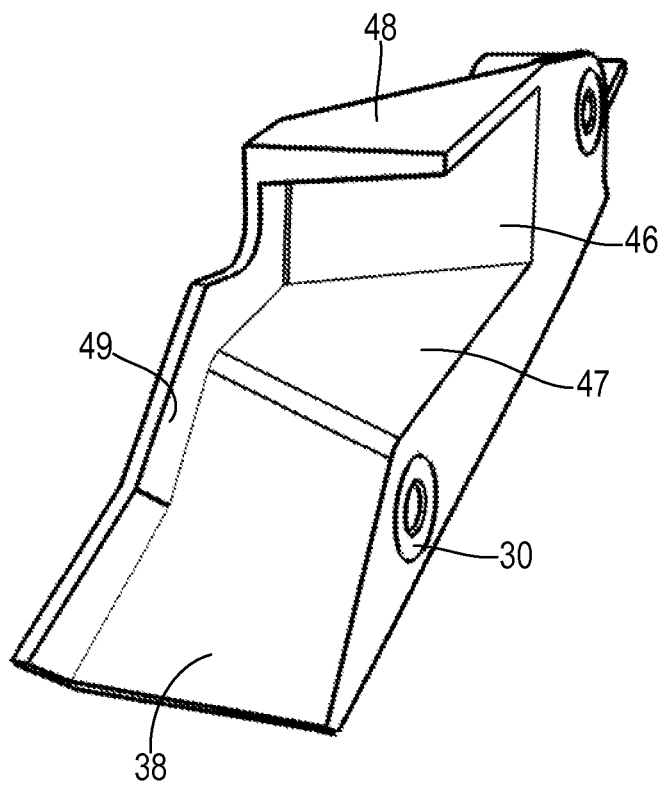
FIG. 7 is an end, perspective view of the snubber/diverter of FIG. 2.
Figure 8:
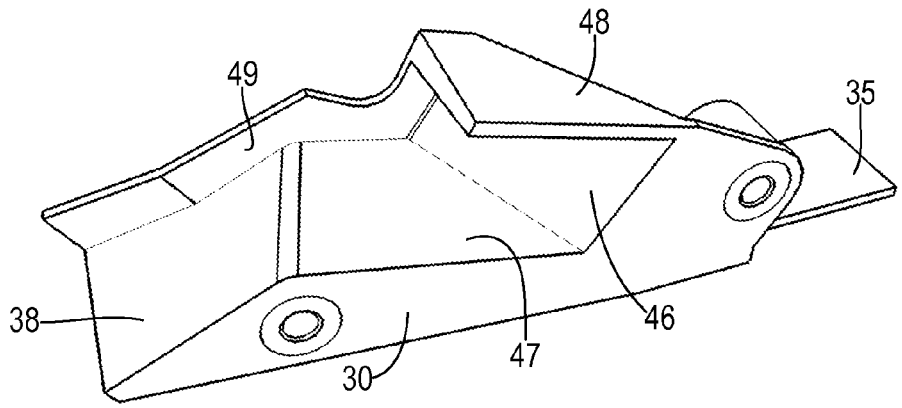
FIG. 8 is another front, perspective view of the snubber/diverter of FIG. 2.
Figure 9:
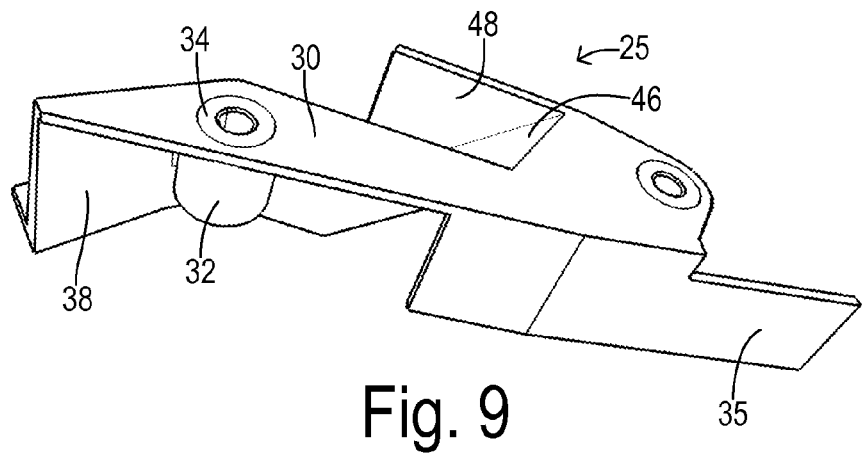
FIG. 9 is a bottom, perspective view of the snubber/diverter of FIG. 2.

A first embodiment of the integrated snubber/diverter is shown in FIGS. 3-9. In addition, FIG. 3 shows the relationship and positioning of snubber 25 with respect to the transaxle case. Snubber 25 includes a molded base plate 30 which is generally planar and supports and integrates all the various elements of the combined snubber/diverter. Posts 31 and 32 extend transversely from base plate 30, and they contain insert molded mounting inserts 33 and 34. Snubber 25 is molded from a plastic such as PTFE, and mounting inserts 33 and 34 are preferably formed of metal such as steel. Inserts 33 and 34 are joined to posts 31 and 32 by a conventional over molding process, for example. Other moldable plastic materials can also be used provided that they have appropriate durability to wear and chemical/temperature exposure and a sufficiently low coefficient of friction.

Figure 2:
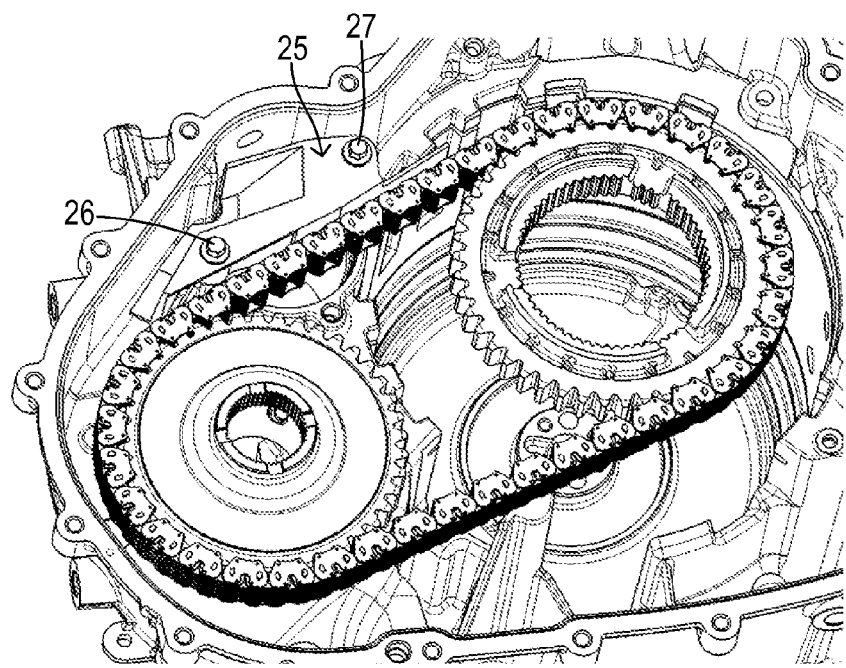
FIG. 2 is a perspective view of the partial assembly of FIG. 1 with the addition of an integrated snubber/diverter according to one embodiment of the present invention.

A snubber plate 35 is also integrally molded with base plate 30 and extends substantially transversely from a longitudinal side 36 of base plate 30 so that snubber plate 35 frames an edge of the drive chain as shown in FIG. 2. Snubber plate 35 preferably includes integrally molded gussets 37 to reinforce snubber plate 35 with base plate 30. Snubber plate 35 is configured with a width and length as appropriate for the associated dimensions of the drive chain.

A ramp plate 38 is integrally molded with base plate 30, and extends substantially transversely from base plate 30. The transaxle case has a lateral side 40 and a case end wall 43. Since mounting inserts 33/34, snubber plate 35, and ramp plate 38 each extends substantially transversely from base plate 30, base plate 30 is substantially parallel to case end wall 43 while snubber plate 35 and ramp plate 38 are substantially transverse to case end wall 43. One skilled in the art will appreciate that these orientations can vary by several degrees while still maintaining the oil flow paths and other functions as described below.

Ramp plate 38 is oriented obliquely with respect to snubber plate 35 as shown at an angle 39. Ramp plate 38 is spaced from lateral side 40 to define an oil passage 41 therebetween. As a result of chain rotation in the direction shown, oil flow 42 is produced (e.g., propelled by the drive chain as it moves with a drive sprocket). Consequently, ramp plate 38 acts as a scraper for peeling off the oil flow generated by the drive chain at about the point where the chain leaves the sprocket, thereby reducing oil windage and parasitic losses along the tension side of the drive chain.

Oil flow 42 along ramp plate 38 is directed into a scoop 45 which serves to transversely deflect the oil flow, i.e., deflecting it away from case end wall 43 and into a path that returns the oil flow to the oil sump (not shown). The direction of the oil flow leaving scoop 45 has a strong transverse component, but is not necessarily fully perpendicular to the direction of the drive chain. A wide variety of angles or contours may be used for the sloping end wall in order to obtain any desired path away from the region of travel for the drive chain and toward a return path to the sump or into a relative dead-zone of the oil recirculation in the interior of the case.

Scoop 45 is comprised in this embodiment of a sloping end wall 46 that provides an angled surface for redirecting the oil flow in the desired direction away from the drive chain and case end wall 43 and toward an interior of the transaxle case. A first sidewall 47 extends between ramp plate 38 and end wall 46, both of which are integrally molded with and extend from base plate 30. Likewise, a second integrally-molded sidewall 48 may define another side of scoop 45 in order to constrain the oil flow and direct it toward sloping end wall 46. Scoop 45 may further include a bottom wall 49, especially in the event that case end wall 43 is not flat and flush with snubber 25 (e.g., has an extended feature behind snubber 25 such as the accumulator shown in FIG. 1).

Figure 10:
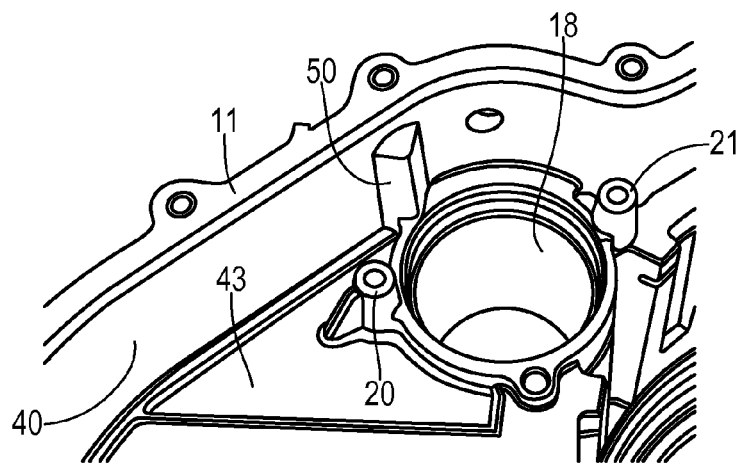
FIG. 10 is a perspective view of the transaxle case having a deflector for directing an oil flow toward the scoop of the diverter.

An additional oil deflector may preferably be disposed at or near lateral side 40 of the case to direct oil flow 42 from passage 41 into scoop 45. The deflector may preferably be comprised of a bump 50 formed in lateral side 40 of the case. For example, the case may be formed as a steel casting wherein bump 50 is created by a corresponding feature in the mold used for casting. FIG. 10 shows a portion of case 11 with other components removed to better illustrate deflector 50, bosses 20 and 21, and accumulator 18.

Figure 11:
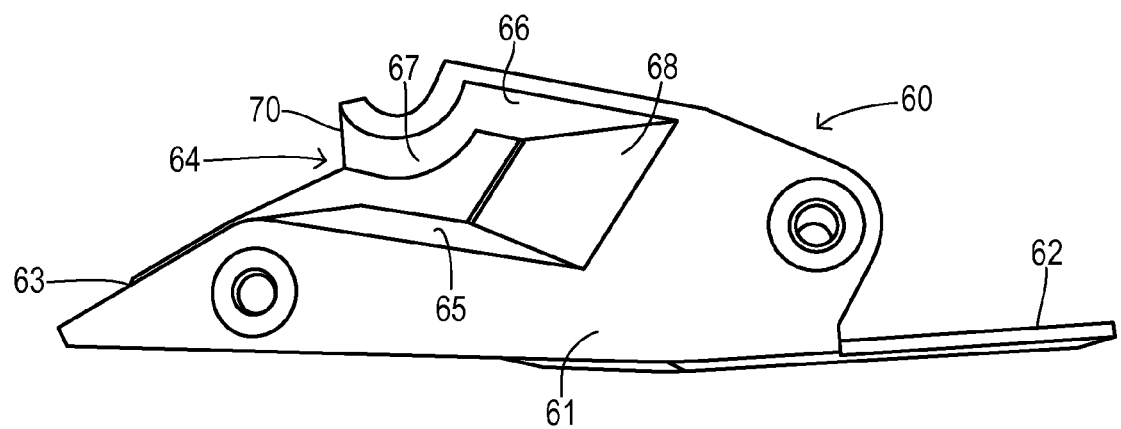
FIG. 11 is a front, plan view of another embodiment of the snubber/diverter with an integral deflector.

In an alternative embodiment shown in FIG. 11, a deflector can be integrally molded with the plastic snubber/diverter. Thus, a snubber 60 includes a base plate 61 that is integrally molded with a snubber plate 62 and a ramp plate 63. A scoop 64 has side walls 65 and 66 forming a passage leading to a sloping end wall 68. Side wall 66 has an integrally-formed, curving deflector 67 at an upstream end of scoop 64. A front edge 70 of deflector 67 would be placed in close proximity to a lateral side of the transaxle case (not shown) so that oil flowing between ramp plate 63 and the case deflects efficiently into scoop 64 to be redirected by sloping end wall 68 into an interior of the case.

What is claimed is:

1. A snubber for a chain in a transaxle, comprising:
   a molded base plate;
   a pair of mounting inserts extending transverse to the base plate to mount the snubber to a case of the transaxle;
   a snubber plate integrally molded with the base plate and extending substantially transversely from a longitudinal side of the base plate to frame an edge of the chain;
   a ramp plate integrally molded with the base plate and extending substantially transversely from the base plate and obliquely with respect to the snubber plate; and
   a scoop integrally molded with the base plate and extending from the ramp plate configured to transversely deflect a flow of transaxle oil directed to the scoop by the ramp plate.

2. The snubber of claim 1 wherein the scoop is comprised of a sloping end wall and a side wall joining the ramp plate and the end wall.

3. The snubber of claim 1 wherein the base plate is configured to mount to the case so that the ramp plate is spaced from a lateral side of the case to define an oil passage for receiving a flow of transaxle oil driven by rotation of the chain.

4. The snubber of claim 3 further comprising a deflector disposed at the lateral side of the case to deflect the transaxle oil flow in the passage into the scoop.

5. The snubber of claim 4 wherein the deflector is integrally molded with the scoop and forms a side of the passage.

6. A transaxle comprising:
   a case adapted to retain a transaxle oil;
   a chain mounted to a pair of gears for transferring torque between the gears along a tension side of the chain; and
   a snubber disposed along the tension side of the chain, wherein the snubber comprises:
   a molded base plate;
   a pair of mounting inserts extending transverse to the base plate to mount the snubber to the case;
   a snubber plate integrally molded with the base plate and extending substantially transversely from a longitudinal side of the base plate to frame an edge of the chain;
   a ramp plate integrally molded with the base plate and extending substantially transversely from the base plate and obliquely with respect to the snubber plate; and
   a scoop integrally molded with the base plate and extending from the ramp plate configured to transversely deflect a flow of the transaxle oil directed into the scoop by the ramp plate.

7. The transaxle of claim 6 wherein the scoop is comprised of a sloping end wall and a side wall joining the ramp plate and the end wall.

8. The snubber of claim 6 wherein the base plate is configured to mount to the case so that the ramp plate is spaced from a lateral side of the case to define an oil passage for receiving a flow of transaxle oil driven by rotation of the chain.

9. The snubber of claim 8 further comprising a deflector disposed at the lateral side of the case to deflect the transaxle oil flow in the passage into the scoop.

10. The snubber of claim 9 wherein the deflector is integrally molded and forms a side of the passage.

11. The snubber of claim 9 wherein the deflector is formed in the lateral side of the case.

12. An integrally molded article, comprising:
- a base plate with a pair of transverse mounting inserts;
- a chain snubber plate extending transversely from a longitudinal side of the base plate to frame a chain of a transaxle;
- a ramp plate extending transversely from the base plate, oblique with respect to the snubber plate; and
- a scoop extending from the ramp plate to transversely deflect a transaxle oil flow pushed into the scoop by the chain.

\* \* \* \* \*